(12) United States Patent
Young

(10) Patent No.: US 10,736,029 B1
(45) Date of Patent: Aug. 4, 2020

(54) ENABLING NETWORK-SLICE FUNCTIONS IN TRANSPORT DOMAINS

(71) Applicant: Verizon Patent and Licensing Inc., Arlington, VA (US)

(72) Inventor: Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/401,715

(22) Filed: May 2, 2019

(51) Int. Cl.
*H04W 4/00* (2018.01)
*H04W 48/18* (2009.01)
*H04W 8/26* (2009.01)
*H04L 12/46* (2006.01)
*H04W 40/24* (2009.01)
*H04W 88/18* (2009.01)
*H04L 12/749* (2013.01)

(52) U.S. Cl.
CPC ......... *H04W 48/18* (2013.01); *H04L 12/4633* (2013.01); *H04L 45/741* (2013.01); *H04W 8/26* (2013.01); *H04W 40/246* (2013.01); *H04W 88/18* (2013.01)

(58) Field of Classification Search
CPC ............. H04L 12/4633; H04L 12/4641; H04L 61/2503
See application file for complete search history.

(56) References Cited

U.S. PATENT DOCUMENTS

2019/0182875 A1* 6/2019 Talebi Fard .......... H04W 76/11
2020/0007590 A1* 1/2020 Dodd-Noble ......... H04L 65/104

* cited by examiner

*Primary Examiner* — Omoniyi Obayanju

(57) ABSTRACT

A device may obtain a Segment Routing Internet Version 6 (SRv6) packet; determine a first segment identifier, based on the SRv6 packet, that includes a node identifier, a function identifier, and a Single-Network Slice Selection Assistance Information (S-NSSAI); obtain the function identifier and the S-NSSAI from the segment identifier; and execute a first instruction, which corresponds to the function identifier, for a network slice specified by the S-NSSAI.

20 Claims, 11 Drawing Sheets

US 10,736,029 B1

ENABLING NETWORK-SLICE FUNCTIONS IN TRANSPORT DOMAINS

BACKGROUND INFORMATION

In order to satisfy the needs and demands of users of mobile communication devices, providers of wireless communication services continue to improve available services. One aspect of such improvements includes the ability to rapidly deploy network slices. Each network slice is a logical network capable of providing negotiated services.

DETAILED DESCRIPTION OF PREFERRED EMBODIMENTS

The following detailed description refers to the accompanying drawings. The same reference numbers in different drawings may identify the same or similar elements.

Many advanced networks today use Network Slice Selection Assistance Information (NSSAI) and Single NSSAI (S-NSSAI) to identify network slices. These identifiers may be visible in, for example, Fifth Generation (5G) core networks and 5G Radio Access Networks (RANs). Network slices may be easily managed to the extent that S-NSSAIs are visible.

For end-to-end network slice management, S-NSSAIs must be visible at the transport layer. However, no transport layer-specific mechanism currently exists for supporting network slice management. No field is designated in packets in the transport layer for carrying S-NSSAIs. Without the support of S-NSSAIs in the transport layer, networks cannot be managed end-to-end on a per-slice basis.

Although there are many techniques for tagging data plane packets (e.g., Virtual Local Area Network (VLAN) tags, Virtual Extensible Local Area Network (VXLAN) tags, etc.), none of these techniques is suited for tagging packet on per network slice basis. For example, an Ethernet frame includes a VLAN tag field that has enough bits to identify one of 4096 possible VLANS. Because there are $2^{32}$ possible S-NSSAIs, however, a VLAN tag cannot be adapted to carry an S-NSSAI. Similarly, a VXLAN field, which can be used to identify $2^{24}$ VXLANs, cannot be adapted to carry an S-NSSAI.

Figure 1:
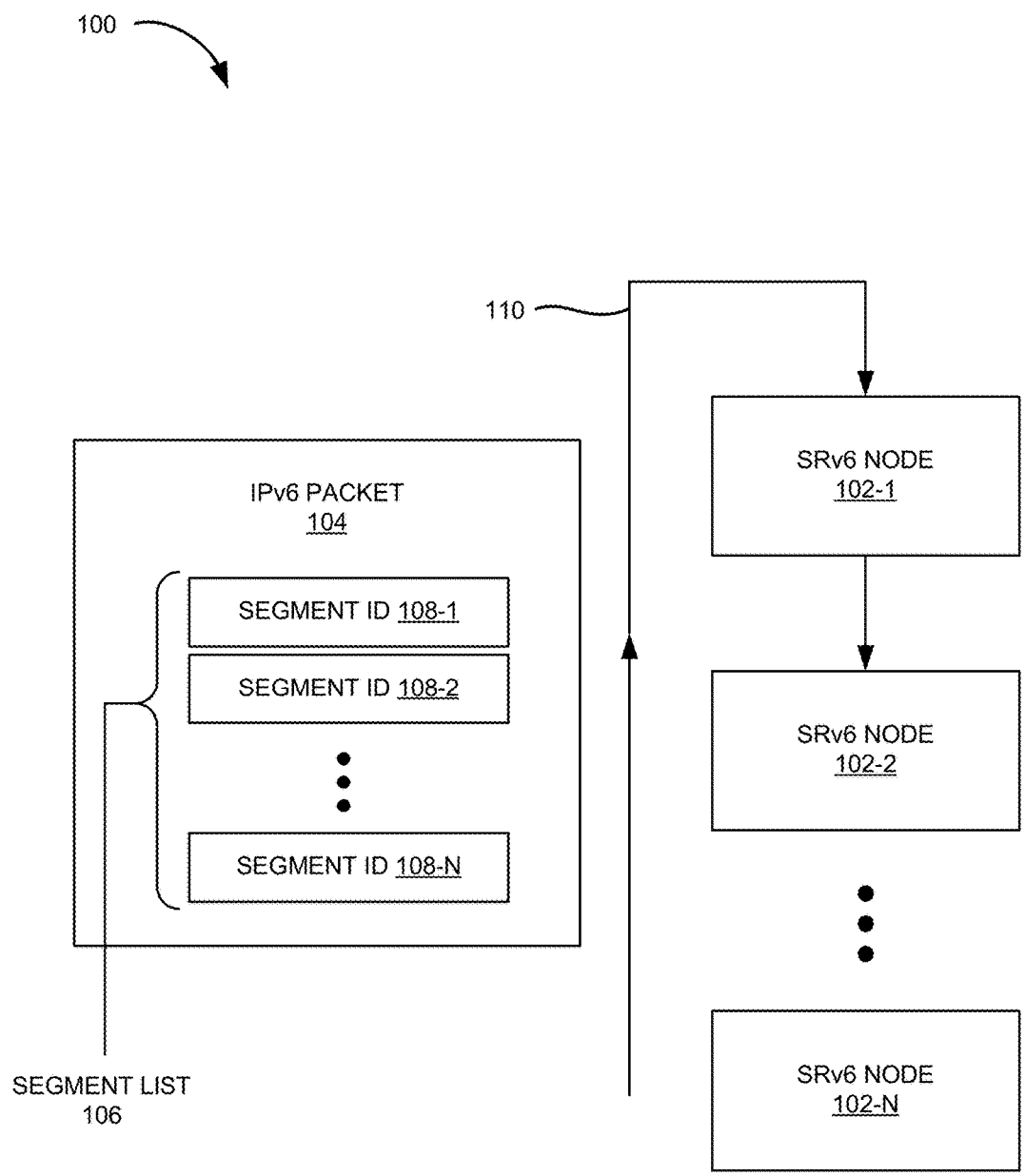
FIG. 1 illustrates the concepts described herein.

In this specification, a system may provide support for end-end management of network slices in the transport domain. The system accomplishes the foregoing by applying Segment Routing (SR) Internet Protocol version 6 (SRv6) to network slices. FIG. 1 illustrates the concept. As shown, a system 100 includes SRv6 nodes 102-1 through 102-N (herein collectively referred to as "SRv6 nodes 102" or generically as "SRv6 node 102"). SRv6 nodes 102 may form an SR domain within the transport domain.

To manage network slices, system 100 performs packet encapsulation and un-encapsulation. That is, when a packet enters the SR domain, system 100 adds an Internet Protocol version 6 (IPv6) header to and inserts a segment list 106 in the packet. When the packet leaves the SR domain, system 100 un-encapsulates (or "decapsulates") the packet.

As shown, segment list 106 includes a list of Segment Identifiers (SIDs) 108-1 through 108-N. In contrast to a typical SID, SID 108 in FIG. 1 carries not only an identifier for an SRv6 node, but also an S-NSSAI and another identifier associated with a function. The function is to be performed by an SRv6 node 102 for the network slice designated by the S-NSSAI.

In FIG. 1, when an SRv6 node 102 (e.g., SRv6 node 102-2) receives a packet 104, the SRv6 node 102 obtains SID 108 associated with the node 102 from segment list 106. SRv6 node 102 extracts, from the obtained SID 108, the S-NSSAI and an identifier for the function to be applied to the network slice. SRv6 performs the function and forwards the packet 104 to the next SRv6 node 102 identified by one of SIDs 108. Because system 100 is capable of handling S-NSSAIs and the functions at specific nodes (e.g., nodes selected by the network operator or administrator) in the transport domain, system 100 is also capable of end-to-end management of network slices.

Figure 2:
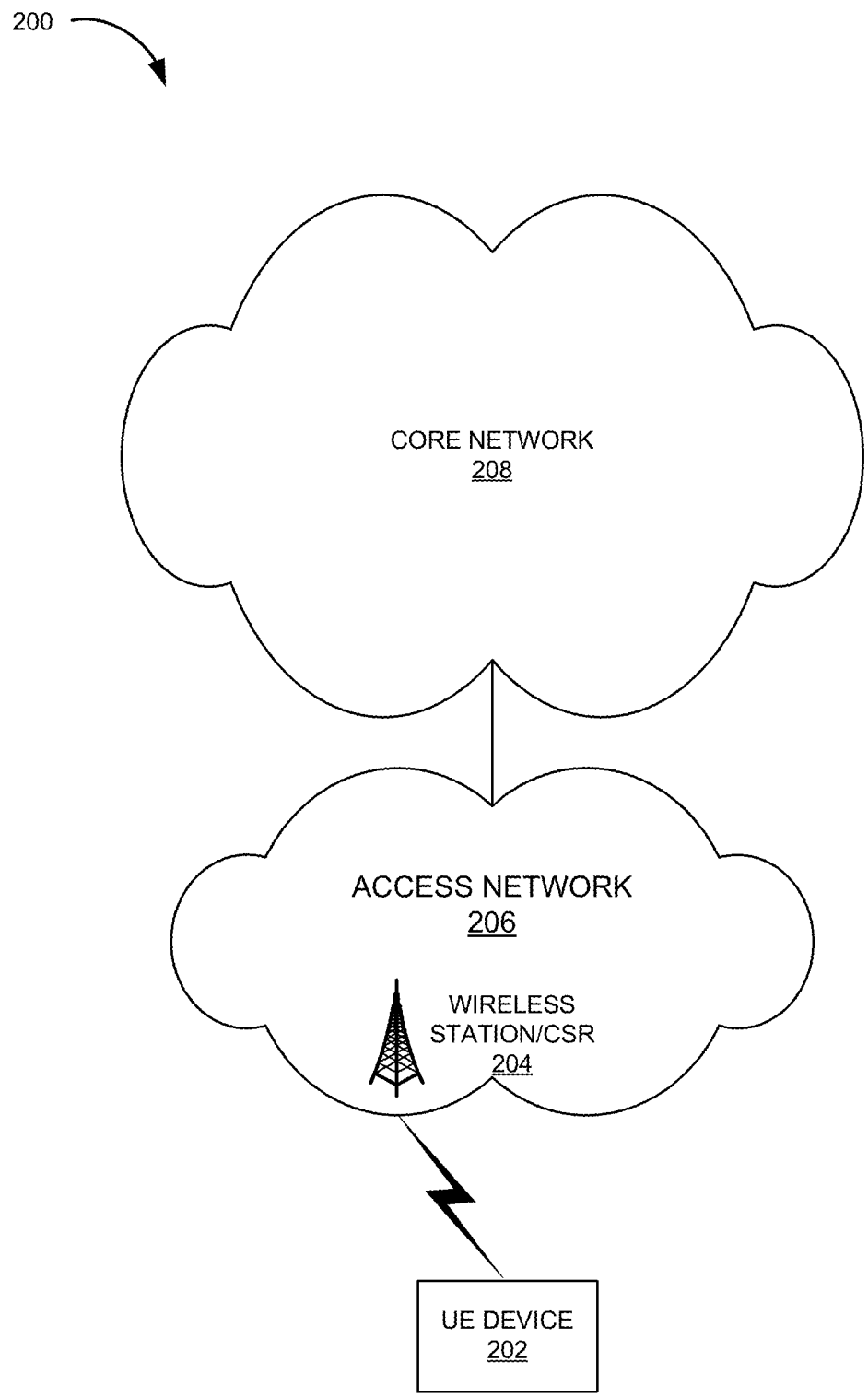
FIG. 2 illustrates an exemplary network environment in which the concepts described herein may be implemented.

FIG. 2 illustrates an exemplary network environment 200 in which the above-described concept may be implemented. As shown, network environment 200 may include a User Equipment (UE) device 202, an access network 206, and a core network 208. Depending on the implementation, network environment 200 may include additional networks and components than those illustrated in FIG. 2. For simplicity, FIG. 2 does not show all components that may be included in network environment 200 (e.g., routers, bridges, wireless access point, additional UE devices, etc.).

UE device 202 may include a wireless computational, communication device. Examples of a UE device 202 include: a smart phone; a tablet device; a wearable computer device (e.g., a smart watch); a global positioning system (GPS) device; a laptop computer; a media playing device; a portable gaming system; and an Internet-of-Thing (IoT) device. In some implementations, UE device 202 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 202 may send packets over or to core network 208.

Access network 206 may allow UE device 202 to access core network 208. To do so, access network 206 may establish and maintain, with participation from UE device 202, an over-the-air channel with UE device 202; and maintain backhaul channels with core network 208. Access network 206 may convey information through these channels, from UE device 202 to core network 208 and vice versa.

Access network 206 may include a Long-term Evolution (LTE) radio network and/or a 5G radio network or other advanced radio network. These networks may include many wireless stations, one of which is illustrated in FIG. 2 as wireless station 204 for establishing and maintaining an over-the-air channel with UE device 202.

Wireless station 204 may include a Fourth Generation (4G), 5G, or another type of wireless station (e.g., eNB, gNB, etc.) that includes one or more radio frequency (RF) transceivers. Wireless station 204 (also referred to as wireless station 204) may provide or support one or more of the following: carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless station 204 may be part of an evolved UMTS Terrestrial Network (eUTRAN).

In some implementations, each cell site within access network 206 may include not only wireless station 204, but also a cell site (CSR) router, which performs edge routing at the cell site that hosts wireless station 204. Depending on the implementation, a single device or separate devices may perform the functions of a wireless station and a CSR. In the following discussion, for simplicity, the wireless station and the CSR are illustrated and referred to as a single device.

Wireless station/CSR 204 may include a router. In one implementation, wireless station/CSR 204 may serve as an SRv6 node 102. When serving as a source SRv6 node 102, wireless station/CSR 204 may obtain S-NSSAI based on a packet associated with UE device 202 (assuming that there is a data connection) and associates the obtained S-NSSAI with UE device 202. When wireless station/CSR 204 receives uplink packets from UE device 202 (over the same data connection), wireless station/CSR 204 may encapsulate each packet as an IPv6 packet and insert segment list 106 in each of the encapsulated packets, so that the encapsulated packets may be processed on per-network slice bases by SRv6 nodes 102. Depending on the implementation, the CSR component (e.g., within wireless station/CSR 204 or within another device) may or may not serve as a source SRv6 node. For example, in some implementations, gNB or a CU-UP of the gNB may perform the encapsulation and segment list insertion. In such instances, the CSR component may not be a terminating endpoint of the SR path, although the CSR component may still be part of the path.

Core network 208 may include a local area network (LAN), a wide area network (WAN), a metropolitan area network (MAN), an optical network, a cable television network, a satellite network, a wireless network (e.g., a CDMA network, a general packet radio service (GPRS) network, an LTE core network (e.g., a 4G network), a 5G core network, an ad hoc network, a telephone network (e.g., the Public Switched Telephone Network (PSTN), an intranet, or a combination of networks. Core network 108 may allow the delivery of Internet Protocol (IP) services to UE device 202, and may interface with other external networks, such as a packet data network. Core network 208 may include or be connected to one or more packet data networks.

Access network 206 and core network 208 in FIG. 2 may include one or more SRv6 nodes 102. For example, as described above, access network 206 included wireless station/CSR 204, which may function as an SRv6 endpoint (e.g., an ingress SRv6 node). In another example, core network 208 may include at least a User Plane Function (to be described below), which functions as another SRv6 endpoint.

Figure 3:
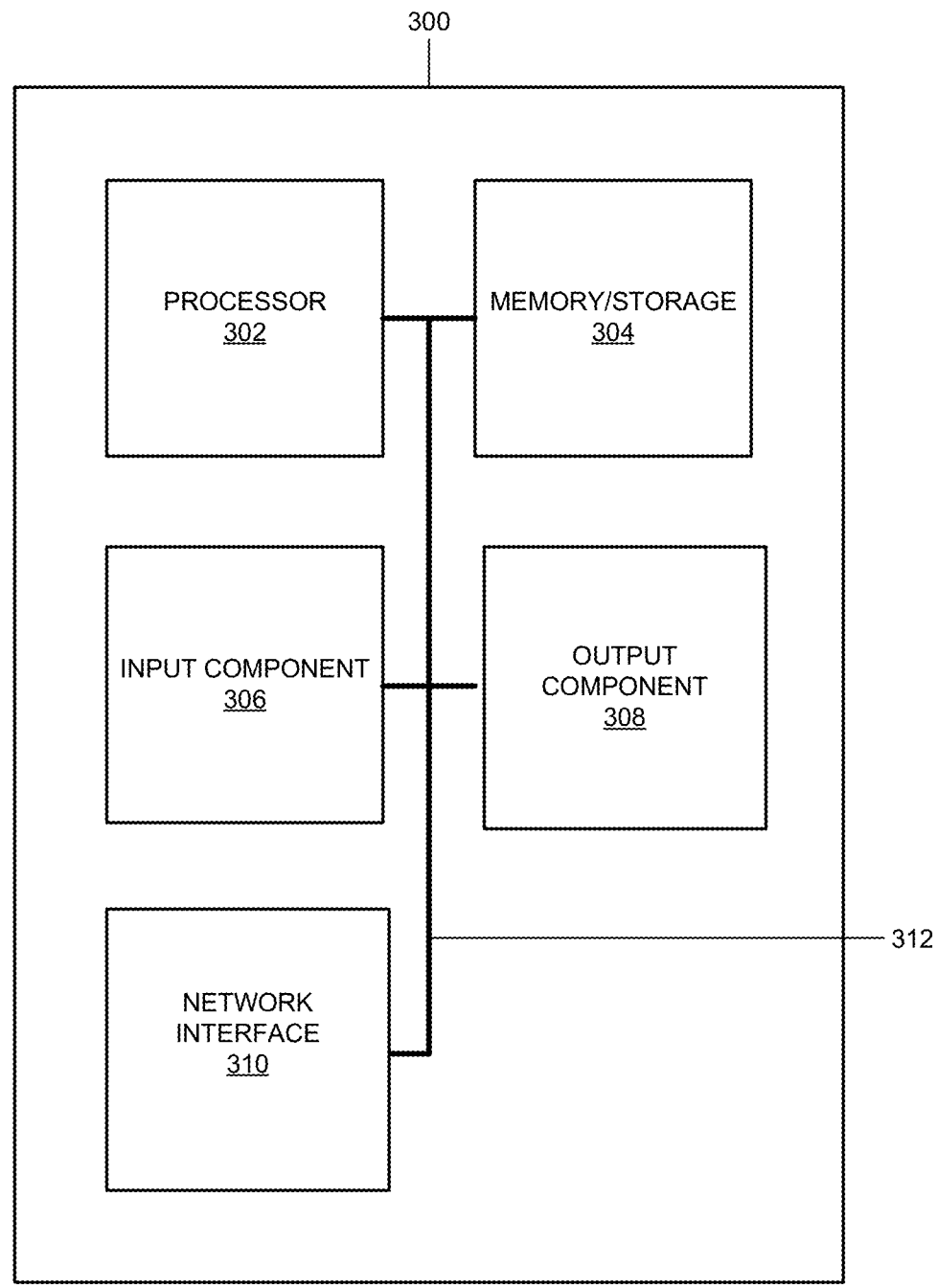
FIG. 3 depicts exemplary components of an exemplary network device.

FIG. 3 depicts exemplary components of an exemplary network device 300. Network device 300 may correspond to or may be included in any of network components of FIG. 1 and FIG. 2 (e.g., SRv6 node 102, UE device 202, a router, a network switch, wireless station/CSR 204, servers, gateways, etc.).

As shown, network device 300 may include a processor 302, memory/storage 304, input component 306, output component 308, network interface 310, and communication path 312. In different implementations, network device 300 may include additional, fewer, different, or a different arrangement of components than the ones illustrated in FIG. 3. For example, network device 300 may include a display, network card, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions. In some implementations, processor 302 may be part of a packet engine or packet processing engine.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may provide input and output from/to a user to/from device 300. Input/output components 306 and 308 may include a display screen, a keyboard, a mouse, a speaker, a microphone, a camera, a DVD reader, USB lines, and/or other types of components for obtaining, from physical events or phenomena, to and/or from signals that pertain to device 300.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc.

Network interface 310 may include an Ethernet interface to a LAN, and/or an interface/connection for connecting device 300 to other devices (e.g., a Bluetooth interface). For example, network interface 310 may include a wireless modem for modulation and demodulation.

Communication path 312 may enable components of network device 300 to communicate with one another.

Network device 300 may perform the operations described herein in response to processor 302 executing software instructions stored in a non-transient computer-readable medium, such as memory/storage 304. The software instructions may be read into memory/storage from another computer-readable medium or from another device via network interface 310. The software instructions stored in memory/storage (e.g., memory/storage 304, when executed by processor 302, may cause processor 302 to perform processes that are described herein.

Figure 4:
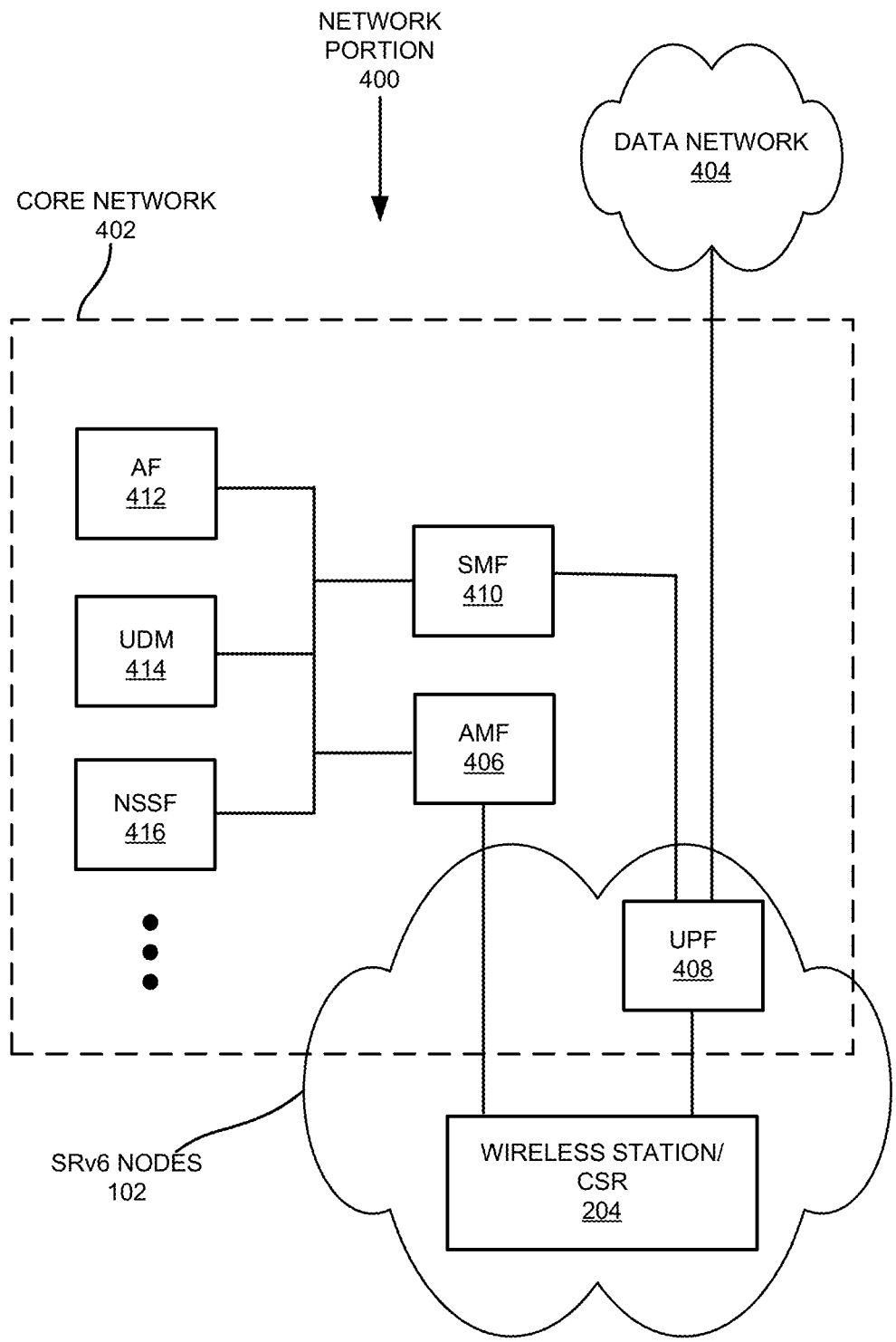
FIG. 4 depicts an exemplary portion, of the network environment of FIG. 2, in which the Segment Routing Internet-Protocol Version 6 (SRv6) nodes of FIG. 1 may be implemented.

FIG. 4 depicts an exemplary portion 400 of network environment 200. FIG. 4 illustrates how SRv6 nodes fit in network environment 200. As shown, network portion 400 may include a core network 402, SRv6 nodes 102, and data network 404. Wireless station/CSR 204, which may be part of access network 206, has been described above with reference to FIG. 2.

Core network 402 is part of core network 208. As shown, core network 402 may include: an Access and Mobility Function (AMF) 406, a User Plane Function (UPF) 408, a Session Management Function (SMF) 410, an Application Function (AF) 412, a Unified Data Management (UDM) device 414, and a Network Slice Selection Function (NSSF) 416. Although core network 402 may include additional network components, for simplicity, they are not illustrated in FIG. 4 (e.g., a Policy Control Function (PCF), a 5G Equipment Identity Register (EIR), a Short Message Service Function (SMSF), a Network Exposure Function (NEF), a Network Repository Function (NRF), an Authentication Server Function (AUSF), etc.).

AMF 406 may perform registration management, connection management, reachability management, mobility management, lawful intercepts, Short Message Service (SMS) transport between UE device 202 and an SMS function, session management message transport between UE device 202 and SMF 410, access authentication and authorization, location services management, support of non-3GPP access networks, and/or other types of management processes. AMF 406 may page UE device 202 based on mobility category information associated with UE device 202 obtained from UDM 414. In some implementations, AMF 406 may implement some or all of the functionality of managing RAN slices in wireless station 204.

UPF 408 may maintain an anchor point for intra/inter-RAT mobility (e.g., mobility across different radio access technologies (RATs); maintain an external Packet Data Unit (PDU) point of interconnect to a data network (e.g., an IP network, etc.); perform packet routing and forwarding; perform the user plane part of policy rule enforcement; perform packet inspection; perform lawful intercept; perform traffic usage reporting; perform Quality-of-Service (QoS) handling in the user plane; perform uplink traffic verification; perform transport level packet marking; perform downlink packet buffering; send and forward an "end marker" to a RAN node (e.g., wireless station 204); and/or perform other types of user plane processes.

As shown in FIG. 4, UPF 408 is part of SRv6 nodes 102. In one implementation, UPF 408 operates as one endpoint of an SRv6 path, with wireless station/CSR 204 being the other endpoint. When UPF 408 forwards a downlink packet, UPF 408 may operate as a source SRv6 node 102. In such a case, UPF 408 encapsulates the packet with IPv6 and SRv6 headers and inserts segment list 106 in the encapsulated packet. In contrast, when wireless station/CSR 204 forwards an uplink packet, wireless station/CSR 204 may act as a source SRv6 node 102. In such a case, wireless station/CSR 204 encapsulates the packet with IPv6 and SRv6 headers and inserts segment list 106 in the encapsulated packet. When UPF 408 functions as an egress node, UPF 408 may un-encapsulate an SRv6 packet exiting the SR domain.

SMF 410 may perform session establishment, modification and/or release; perform IP address allocation and management; perform Dynamic Host Configuration Protocol (DHCP) functions; perform selection and control of UPF 408; configure traffic steering at UPF 408 to guide traffic to the correct destination; terminate interfaces toward a Policy Control Function; perform lawful intercepts; charge data collection; support charging interfaces; control and coordinate charging data collection; terminate session management parts of Non-Access Stratum (NAS) messages; perform downlink data notification; manage roaming functionality; and/or perform other types of control plane processes for managing user plane data.

AF 412 may provide services associated with a particular application, such as, for example, application on traffic routing, accessing a Network Exposure Function, interacting with a policy framework for policy control, and/or other types of applications.

UDM 414 may maintain subscription information for UE devices 202; manage subscriptions; generate authentication credentials; handle user identification; perform access authorization based on subscription data; perform network function registration management; maintain service and/or session continuity by maintaining assignment of SMF 410 for ongoing sessions; support SMS delivery, support lawful intercept functionality; and/or perform other processes associated with managing user data. For example, UDM 414 may store subscription profiles that include authentication, access, and/or authorization information. Each subscription profile may include: information identifying UE device 202; authentication and/or authorization information for UE device 202; information identifying services enabled and/or authorized for UE device 202; device group membership information for UE device 202; and/or other types of information associated with UE device 202. Furthermore, the subscription profile may include mobility category information associated with UE device 202.

NSSF 416 may select a set of network slice instances to serve a particular UE device 202, determine NSSAI, determine a particular AMF 406 to serve a particular UE device 202, and/or perform other types of processes associated with network slice selection or management.

SRv6 nodes 102 may include wireless station/CSR 204, UPF 408, and other SRv6-capable components that belong to the same SR domain. Depending on the implementation, SRv6 nodes may include other network components and devices (i.e., other than UPF 408 and/or wireless station/

CSR 204). As mentioned above, depending on the implementation, the CSR (within wireless station/CSR 204 or within another device) may not necessarily serve as an endpoint of an SR path. The endpoint SRv6 function may be performed by, for example, a wireless station such gNB or a CU-UP of the gNB. In such instances, the node performing the CSR function may be part of the SR path rather than a terminating endpoint of the SR path. Data network 404 may include one or more IP networks and/or other types of networks.

Although FIG. 4 depicts network portion 400 as having a single instance of network functions (e.g., AMF 406, UPF 408, SMF 410, AF 412, UDM 414, NSSF 416, etc.), in practice, portion 400 may include multiple instances of these components. Furthermore, portion 400 may include fewer components, different components, differently arranged components, or additional components than depicted in FIG. 4.

Figure 5:
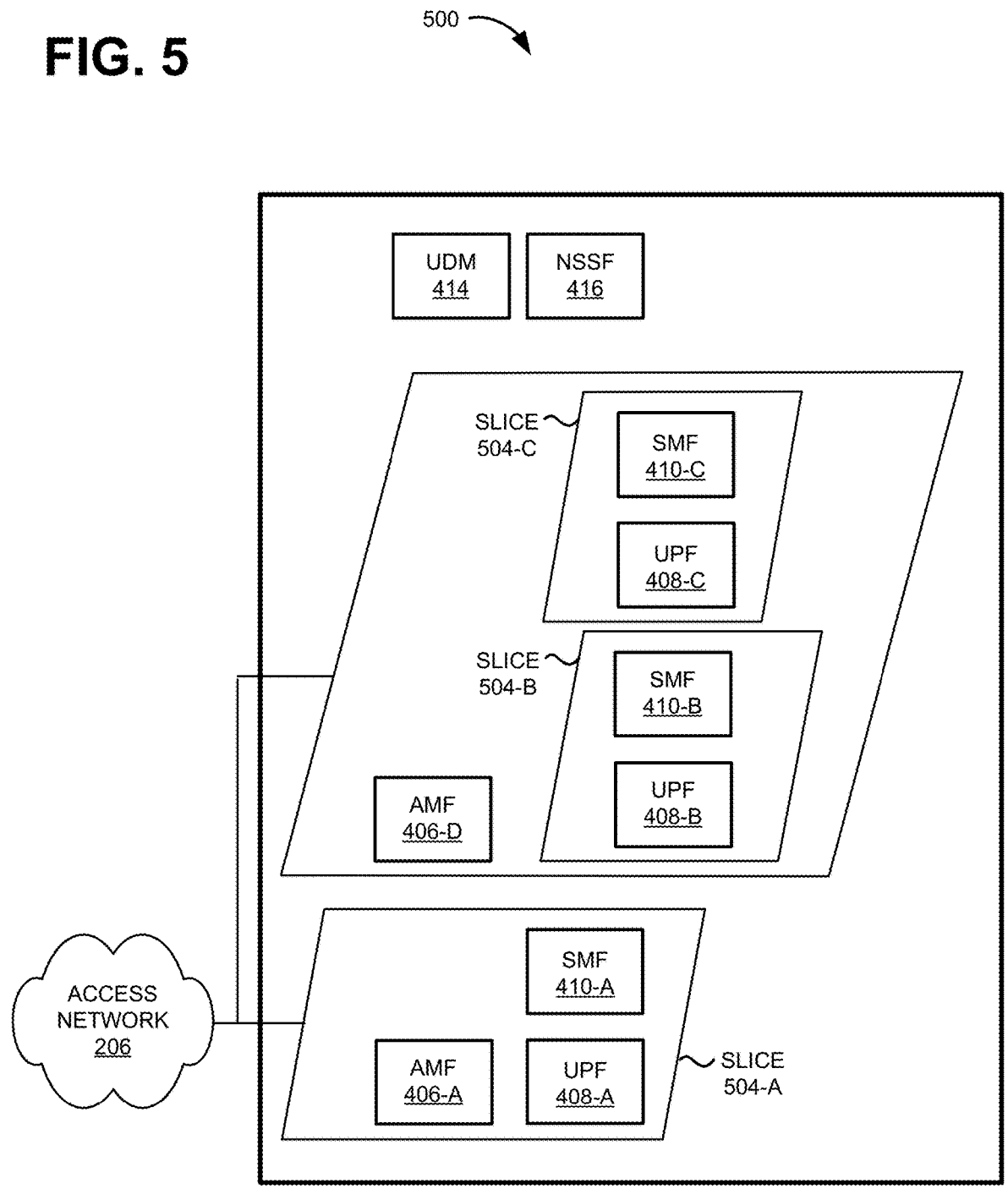
FIG. 5 illustrates exemplary network slices.

FIG. 5 depicts exemplary network slices 504-A, 504-B, and 504-C. FIG. 5 illustrates how network components of FIG. 4 may be deployed as part of network slices and how nodes that serve as SRv6 nodes 102 may also be part of network slices. For FIG. 5, assume that multiple UE devices 202 request services from core network 208. In response to the requests from UE devices 202, core network 208 uses different network slices 504-A, 504-B, and 504-C to provide the services.

As shown, slice 504-A includes at least AMF 406-A, UPF 408-A, and SMF 410-A; slice 504-B includes at least UPF 408-B and SMF 410-B; and slice 504-C includes at least UPF 408-C and SMF 410-C. AMF 406-D belongs to both slice 504-B and slice 504-C. UDM 414 and NSSF 416 belongs to all of network slices 504-A, 504-B, and 504-C.

For each of network slices 504-A, 504-B, and 504-C, there is a corresponding S-NSSAI. When requested by a network component, NSSF 416 may fetch an S-NSSAI for the corresponding network slice. For each of network slices 504-A, 504-B, and 504-C, SRv6 nodes 102 in the transport layer process packets and perform network slice-related functions.

Figure 6:
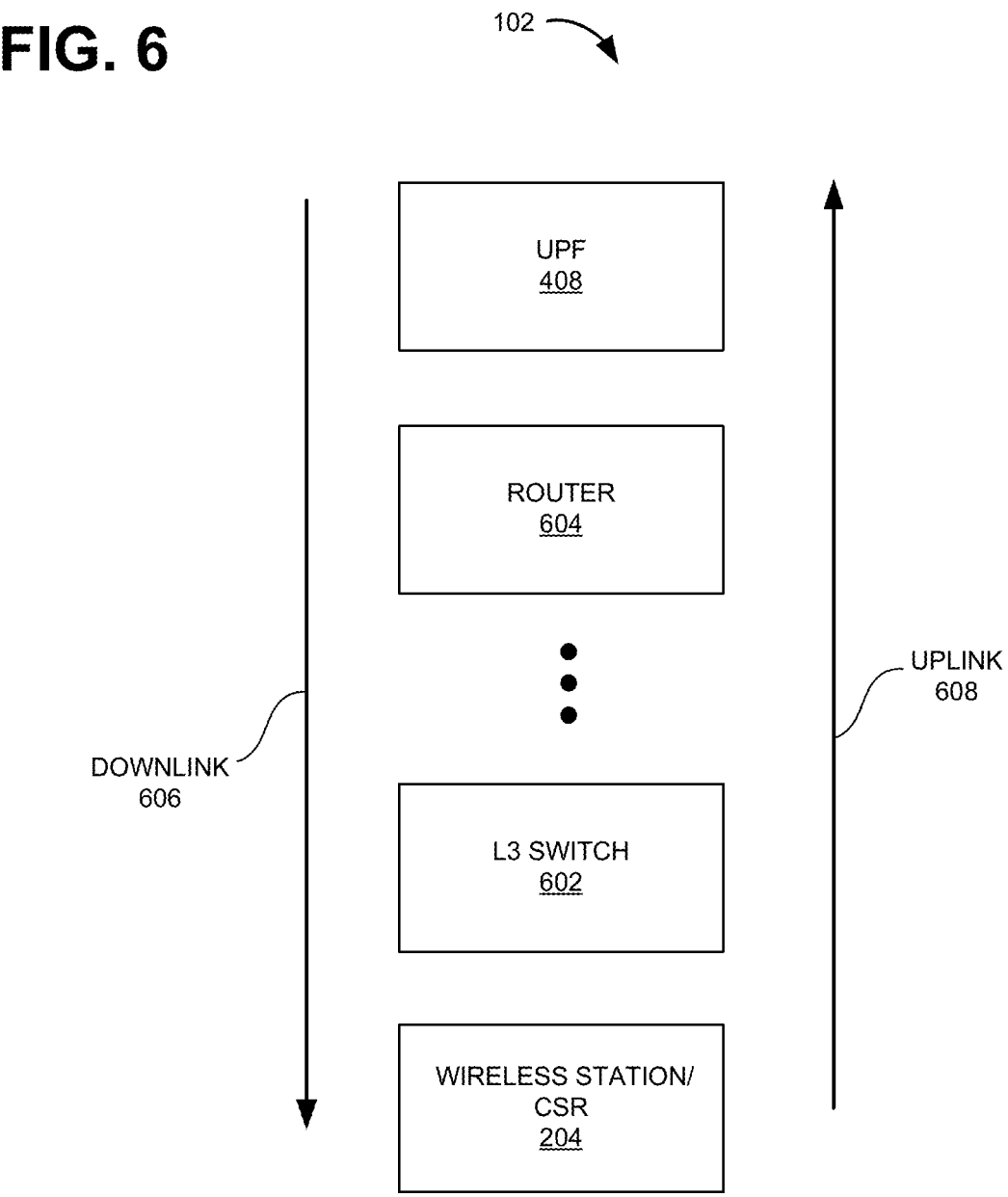
FIG. 6 illustrates exemplary network slice-related processing that is associated with SRv6 nodes according to one implementation.

FIG. 6 illustrates exemplary network slice-related processing associated with SRv6 nodes 102 according to one implementation. The same or different SRv6 nodes 102 may process packets for different network slices. As shown, SRv6 nodes 102 may include a wireless station/CSR 204; hardware or software transport layer components, such as L3 switch 602 or router 604; and UPF 408. In different implementations, a network node or element performing the functions of the CSR may not serve as an SRv6 endpoint, but may be part of the SR path.

Each path that IPv6 packets take through SRV6 nodes 102 is either a downlink path 606 or an uplink path 608. Although FIG. 6 illustrates downlink and uplink paths 606 and 608 as comprising the same SRv6 nodes 102, in different implementations, uplink paths and downlink paths may be through different SRv6 nodes 102 (e.g., different SR domains).

Each of paths 606 and 608 is terminated by two SRv6 nodes 102. For example, UPF 408 and wireless station/CSR 204 terminate downlink path 606 and uplink path 608, as either an ingress or egress SRv6 node. In implementations that include different SRv6 domains, network devices and components other than wireless station/CSR 204 and UPF 408 may serve as either an ingress or egress SRv6 node.

In FIG. 6, when a packet enters downlink path 606, an ingress SRv6 node 102 may operate as a source SRv6 node. Source SRv6 node encapsulates the packet with IPv6 and SRv6 headers. The SRv6 header prescribes what network slice-related function each SRv6 nodes 102 are to perform as the packet traverses downlink path 606. Similarly, when a packet enters uplink path 608, an ingress SRv6 node 102, such as wireless station/CSR 204, may operate as a source SRv6 node, to encapsulate the packet with IPv6 and SRv6 headers. The SRv6 header prescribes what network slice-related function each SRv6 nodes 102 is to perform as the packet traverses uplink path 608. An egress SRv6 node 102 may un-encapsulate a packet that is to exit the path and the SR domain, removing the SRv6 header.

Figure 7:
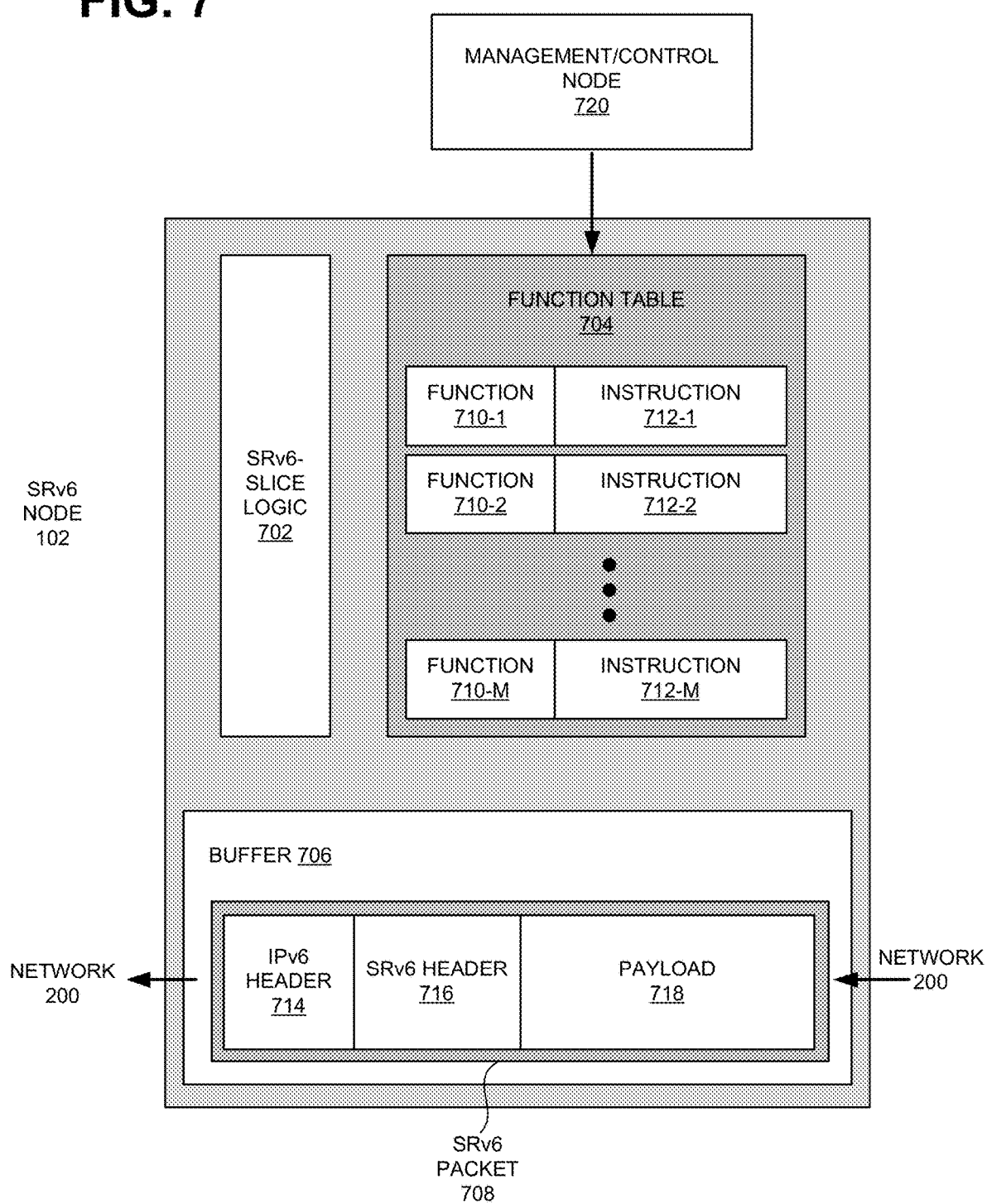
FIG. 7 illustrates exemplary functional components of an SRv6 node and exemplary processing associated with an SRv6 node and an exemplary Segment Routing (SR) header.

When a packet arrives at an SRv6 node 102, whether the SRv6 node is or is not a source SRv6 node 102, SRv6 node 102 may perform a specific function that is associated with the segment identifier corresponding to the SRv6 node 102. FIG. 7 illustrates exemplary functional components of an SRv6 node 102 and how such a function is performed by the SRv6 node 102. As shown, SRv6 node 102 may include SRv6-slice logic 702, a function table 704, and a packet buffer 706.

SRv6-slice logic 702 may include software, hardware, and/or a combination of hardware and software that implement operations associated with packet encapsulation and decapsulation. In addition, SRv6-slice logic 702 may extract network slice information from a received SRv6 packet and perform a function associated with the packet and the network slice.

Function table 704 may include records (or a list) of function identifiers and instructions corresponding to the function identifiers. As shown, for example, function table 704 includes function identifiers 710-1 through 710-M (generically referred to as "function identifier 710" or collectively as "function identifiers 710") and their corresponding instructions 712-1 through 712-M.

At different SRv6 nodes 102, each function table 704 may be different. For example, assume that a function ID in one function table 704 is associated with a set of instructions. In another function table 704, the same function ID may be associated with different set of instructions. Packet buffer 706 may include a memory (e.g., a dynamic memory such as RAM) for storing received packets.

Function table 704 may be managed or updated by a management entity. For example, in FIG. 7, a management or control node 720 may configure and send a function table 704 or updates to function table 704 to SRv6 nodes 102. Management entity 720 may configure each function table 704 differently for different SRv6 nodes 102. Upon receipt of table 704 or the updates, SRv6 logic 702 may store function table 704 or the updates in persistent storage.

In FIG. 7, when a packet 708 is at SRv6 node 102, SRv6 node 102 temporarily stores packet 708 in packet buffer 706. Packet 708 is an SRv6 packet that includes an IPv6 header 714, an SRv6 header 716, and a payload 718. IPv6 header 714 and SRv6 header 716 are described below with reference to FIGS. 8, 9A, and 9B.

When SRv6 packet 708 is in packet buffer 706, SRv6-Slice logic 702 performs the following: extract SRv6 header 716 from SRv6 packet 708; obtain a function identifier and an S-NSSAI from within the SRv6 header 716; and look up the function identifier in function table 704. When SRv6 logic 702 finds the matching function identifier 710 in table 704, SRv6 logic 702 retrieves the instruction 712 associated with the function identifier 710 and executes the instruction for the network slice specified by the S-NSSAI. Thereafter, SRv6 logic 702 updates the SRv6 header (to be described below) in SRv6 packet 708 and forwards SRv6 packet 708 to its next SRv6 node 102 (e.g., a router) in the SR domain.

Figure 8:
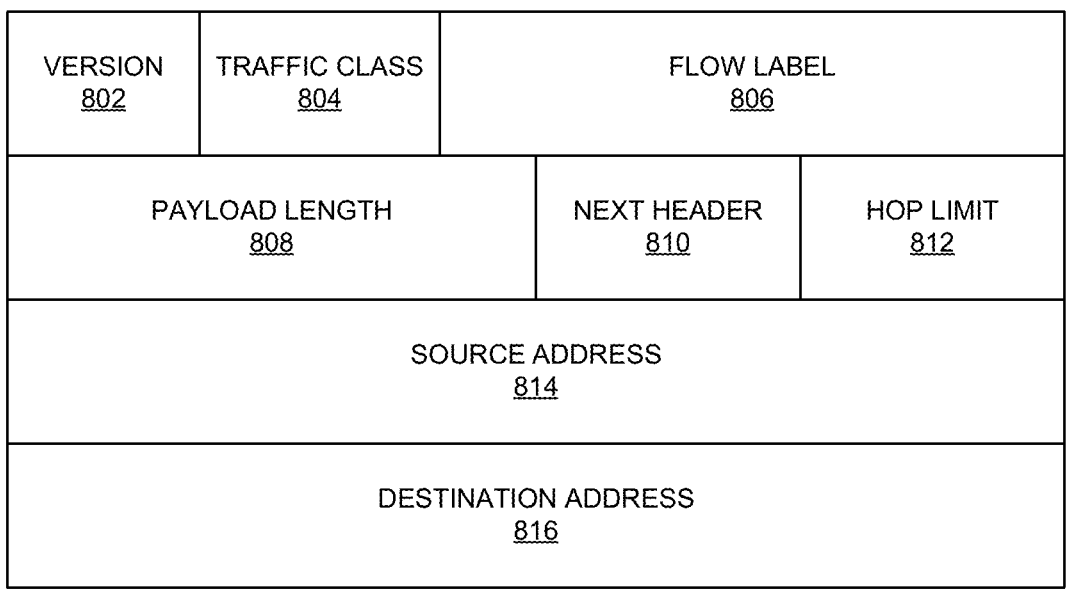
FIG. 8 shows exemplary fields of the Internet Protocol Version 6 (IPv6) header of FIG. 7.

FIG. 8 shows exemplary fields of IPv6 header 714 of SRv6 packet 708. As shown, IPv6 header 714 may include a version field 802, a traffic class field 804, a flow label field 806, a payload length field 808, a next header field 810, a hop limit field 812, a source address field 814, and a destination address field 816. Version field 802 may contain a version number of the Internet Protocol associated with packet 708. Traffic class field 804 may indicate a type of service. Field 804 may also include information regarding network traffic congestion. Flow label field 806 indicates a packet sequence number. Payload length field 808 may indicate the length of payload 718.

Next header field 810 may indicate the type of extension header, which is SRv6 header in this implementation. More specifically, next header field 810 may include a specific numerical value V (e.g., 43) to indicate Segment Routing. An ingress SRv6 node 102 may set the value of Next header field 810 to V when SRv6 logic 702 encapsulates the received packet with IPv6 header 714 and inserts SRv6 header 716 in the encapsulated packet.

Hop limit field 812 may include a numerical value. When SRv6 packet 708 is to leave a node (e.g., router), the node may obtain the value of Hop limit field 812 of packet 708, decrement the value, and replace the value in Hop limit field 812 with the decremented value within packet 708. An IPv6 node may discard packet 708 when the IPv6 node determines that the value of Hop limit field 812 has reached zero.

Source address field 814 and destination address field 816 may respectively include an IPv6 address of the ingress SRv6 node 102 and an IPv6 address of the egress SRv6 node 102 in the SR domain. The values of Source address field 814 and destination address field 816 are set by a source SRv6 node 102 when the source SRv6 node 102 encapsulates packet 708 with IPv6 and SRv6 headers 714 and 716.

Figure 9A:
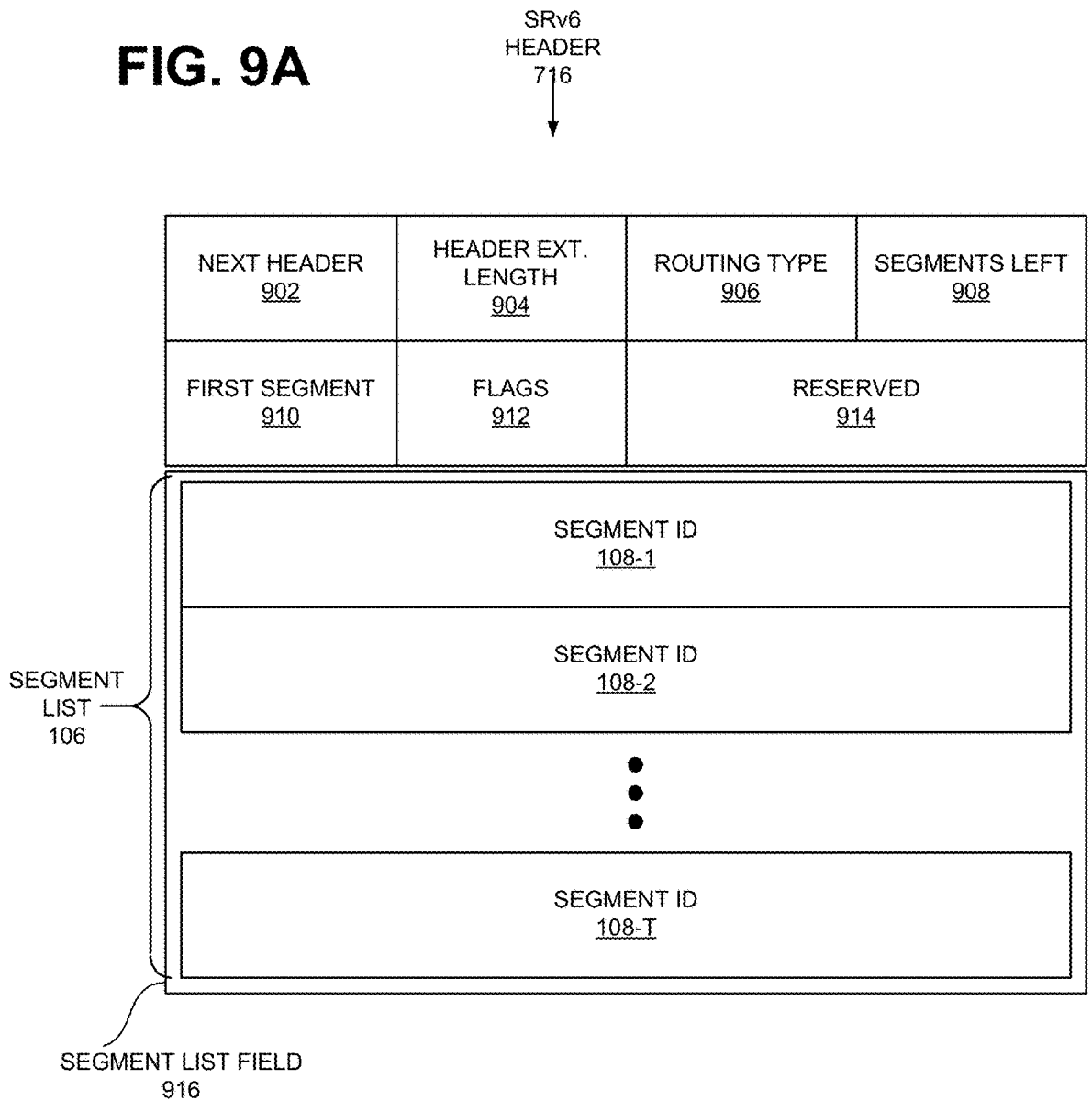
FIG. 9A shows exemplary fields of the SRv6 header of FIG. 7.

FIG. 9A shows exemplary fields of the Segment Routing Version 6 (SRv6) header 716 of FIG. 7. As shown, SRv6 header 716 includes a Next header field 902, a Header extension length field 904, a Routing type field 906, a Segments left field 908, a First segment field 910, a Flags field 912, a Reserved field 914, and a Segment list field 916. Depending on the implementation, SRv6 header 716 may include additional fields, such as fields for Type Length Value (TLV).

Next header field 902 may identify the type of header immediately following SRv6 header 716 in packet 708. Header extension length field 904 may indicate the length of SRv6 header 716. Routing type field 906 may include a value V that indicates segment routing (e.g., V=4).

Segment left field 908 may include a numerical value that represents an offset from the first SID of SRv6 header 716. For example, assume that ten SIDs are listed in Segment list field 916. When packet 708 enters the SR domain, Segment left field 908 of SRv6 packet 708 would be set to 9. As packet 708 traverses through SRv6 nodes 102 in the SR domain, the numerical value of the Segment left field 908 is decremented at each visited SRv6 node 102. At the egress SRv6 node 102 of the SR domain, Segment left field 908 would be zero.

First segment field 910 may include a numerical value that represents an index of the last SID listed in Segment list field 916. For example, if the segment list of an SRv6 packet includes N SIDs, First segment field 910 may include the numerical value of nine (i.e., 9th element in the segment list). Flags field 912 may indicates various characteristics of SRv6 packet 708 that contains the Flags field 914. Flags field 914 may indicate, for example, whether the packet is for network management functions, for alerting a node, etc.

Segment list field 916 may include a segment list 106. As discussed above, segment list 106 includes a sequence of SIDs 108.

Figure 9B:
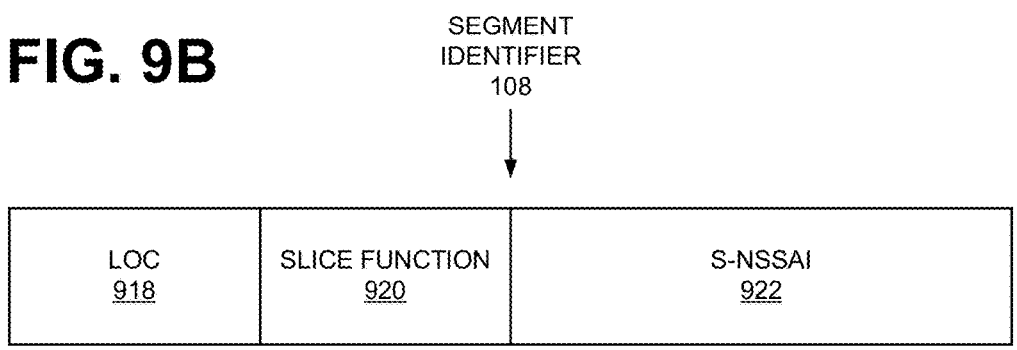
FIG. 9B shows exemplary fields of an exemplary segment identifier in the segment list of FIG. 9A.

FIG. 9B shows exemplary fields of an exemplary SID 108 in segment list 106. As shown, SID 108 may include a LOC (location) field 918, a Slice function field 920, and an S-NSSAI field 922. LOC field 918 may include information that identifies a particular SRv6 node 102. SR logic 702 may route an SRv6 packet based on the information provided by LOC field 918. Slice function field 920 may include a function identifier. When SRv6 packet 708 arrives at an SRv6 node 102, SRv6 node 102 may extract, from the SID 108 corresponding to the SRv6 node 102, the function identifier. SRv6 node 102 may use the function identifier to retrieve the matching instruction 712 in function table 704 and execute the instruction 712. S-NSSAI field 922 may include an S-NSSAI of the network slice associated with packet 708.

In FIG. 9B, S-NSSAI field 922 is at least long enough to hold S-NSSAI, which is 32 bits long. In one implementation, each SID is 128 bits long, and therefore, the combined lengths of LOC field 918 and Slice function field 920 is equal to or less than 96 bits (e.g., 128-32=96).

Figure 10A:
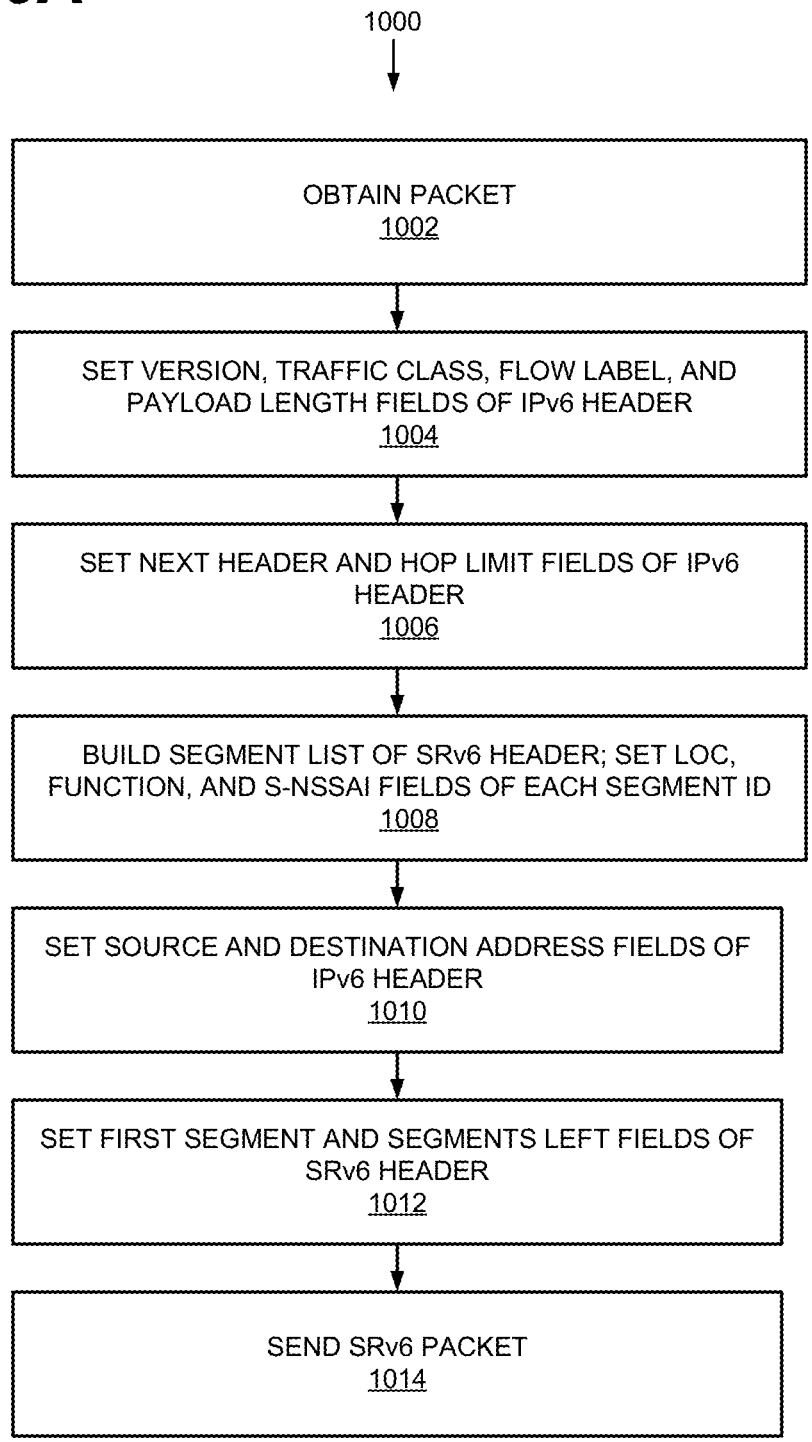
FIGS. 10A and 10B are flow diagrams of exemplary processes associated with the SRv6 nodes of FIG. 1.
Figure 10B:
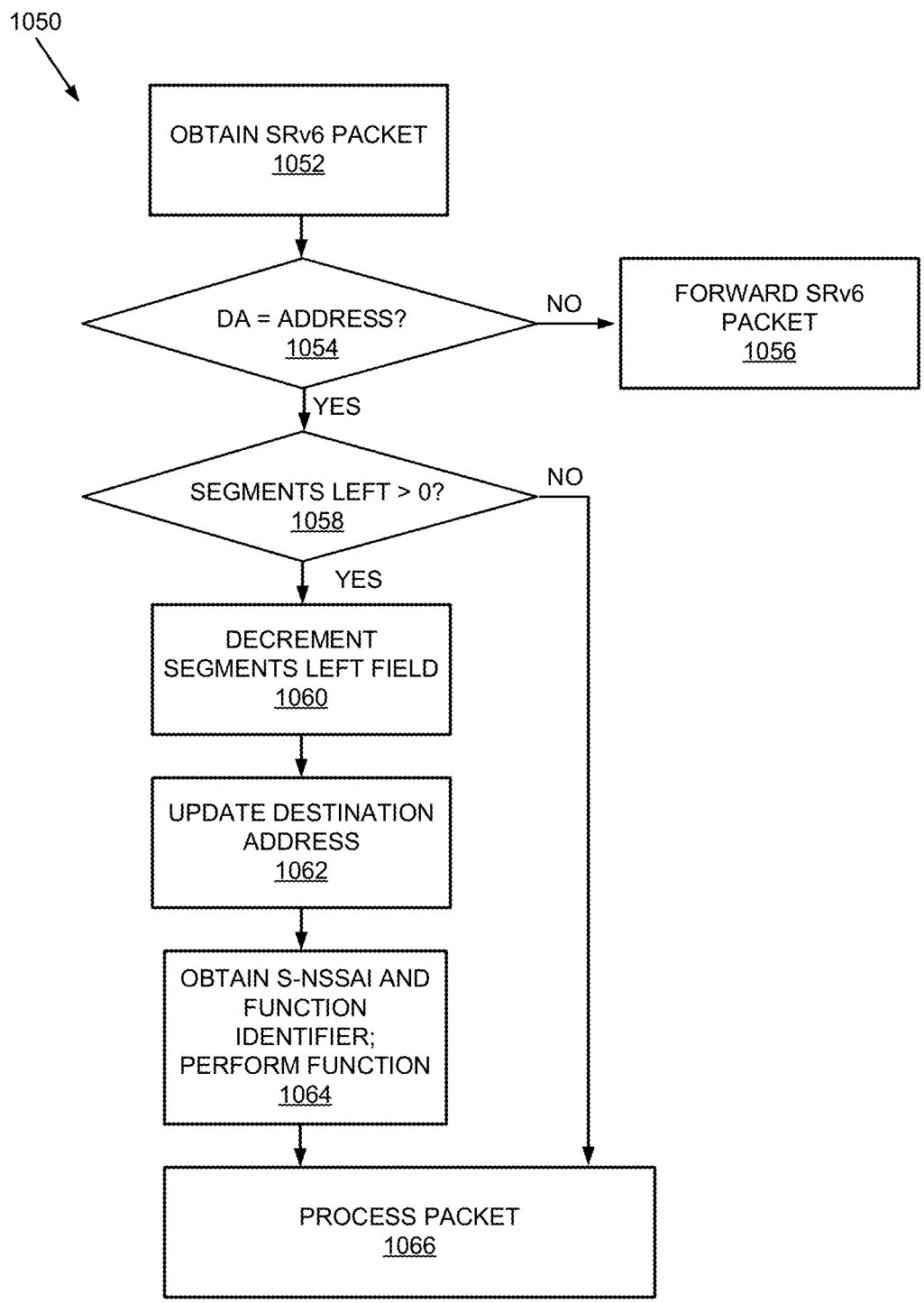

FIGS. 10A and 10B are flow diagrams of exemplary processes associated with SRv6 nodes 102. FIG. 10A is a flow diagram of an exemplary process 1000 associated with a source SRv6 node 102. A source SRv6 node 102 may perform process 1000 in addition to process 1050 illustrated in FIG. 10B.

As shown, process 1000 may include a source SRv6 node 102 obtaining a packet. Obtaining the packet may entail creating a new packet or receiving a packet from another node. The obtained packet may include an IPv4 packet, an IPv6 packet, or yet another type of data/information. Using the obtained packet, the source SRv6 node 102 may create a new SRv6 packet 708, to be sent from the source SRv6 node 102 to other SRv6 nodes 102 in the same SRv6 domain.

To create the new SRv6 packet 708, the source SRv6 node 102 may prepare a new IPv6 header 714 and an SRv6 header 716. The source SRv6 node 102 may assemble the new SRv6 packet 708 by encapsulating the obtained packet with the new IPv6 header 714 and the new SRv6 header 716.

Preparing the new IPv6 header 714 includes setting values of certain fields of the IPv6 header 708, such as the version field 802, a traffic class field 804, flow label field 806, and payload length field 808 (block 1004). For example, the source SRv6 node 102 may set version field 802 to a value corresponding to the IPv6, traffic class field 804 to the value for the obtained packet (e.g., a value indicating the Quality-of-Service), flow label field 806 to a sequence number associated with the obtained packet, and payload length field 808 to the value obtained by calculating the combined size of the new SRv6 header 716 and the obtained packet.

Process 1000 may further include setting the next header field 810 and the hop limit field 812 of the new IPv6 header 714 (block 1006). For example, the next header field 810 may be set to 43 to indicate the inclusion of an SRv6 header 716 in accordance with Internet Assigned Numbers Authority (IANA) assignments and the hop limit field 812 may be set to a value that is greater than the number of hops, to traverse the SRv6 nodes 102 in the segment list 106.

Process 1000 may also include building the segment list 106 (block 1008). The segment list 106 may be used in creating the new SRv6 header 716. To build the segment list 106, the source SRv6 node 102 may create or obtain a list of SIDs 108. For each SID 108, the source SRv6 node 102 may determine an address or label of an SRv6 node 102 which is to process the new SRv6 packet, the name of the function to be performed at the SRv6 node 102, and an S-NSSAI of the network slice associated with the new SRv6 packet. In some implementations, the source SRv6 node 102 may obtain these values from management/control node 720. In some implementations, the source SRv6 node 102 may receive the S-NSSAIs from NSSF 416.

When constructing the segment list 106, the source SRv6 node 102 may arrange the SIDs 108 in the reverse order in which the corresponding SRv6 nodes 102 are to be visited by the new SRv6 packet 708. Thus, after the new SRv6 packet 708 leaves the source SRv6 node 102, the new SRv6 packet 708 is routed first to the SRv6 node 102 associated with the last SID 108 and routed last to the SRv6 node 102 associated with the first SID 108.

Process 1000 may further include the source SRv6 node setting the source address field 814 and the destination address field 816 of the new IPv6 header 714 (block 1010). For example, the source SRv6 node 102 may set the source address field 814 and the destination addresses field 816 to include, respectively, the address of the source SRv6 node 102 and the address of the SRv6 node 102 associated with the last SID 108 in the segment list 106.

The source SRv6 node 102 may also set the segments left field 908 and the first segment field 910 of the new SRv6 header 716 (block 1012). For example, the source SRv6 node 102 may set each of the segments left field 908 and the first segment field 910 to the numerical value equal to one less than the number of SIDs 108. Segments (i.e., N−1, where N=the number of SIDs 108 in the segment list 106).

Once various fields in the new IPv6 header 714 and the new SRv6 header 716 are set, the source SRv6 node 102 may assemble the new SRv6 packet 708, using the new IPv6 header 714, the new SRv6 header 716, and the obtained packet (see the above description of block 1002). The source SRv6 node 102 may send the new SRv6 packet (block 1014).

FIG. 10B illustrates a flow diagram of an exemplary process 1050 that is associated with an SRv6 node 102. Process 1050 may include obtaining an SRv6 packet 708 (block 1052). For example, an SRv6 node 102 may receive an SRv6 packet 708 from a source SRv6 node 102. In another example, a SRv6 node 102 may obtain the SRv6 packet 708 by creating it.

The SRv6 node 102 that obtains the SRv6 packet 708 ("current SRv6 node 102") may determine whether the destination address of the packet 708 matches the address of the current SRv6 node 102 (block 1054). The destination address of the packet 708 may be found in the destination address field 816 of the IPv6 header 716 of the packet 708. If the addresses do not match (block 1054: no), the SRv6 node 102 may forward the SRv6 packet 708 toward its destination (block 1056).

If the addresses match (block 1054: yes), the SRv6 node 102 may determine whether the numerical value in the segments left field 908 of the SRv6 header 716 of the packet 708 is greater than zero (block 1058). If the value is greater than zero (block 1058: yes), the SRv6 node 102 may decrement the segments left field 908 (block 1060). That is, the SRv6 node 102 places, in the segments left field 908, a numerical value that is one less than the value of the segments left field 908. For example, if the segments left field 908 included the numerical value of N, the segments left value would be decremented to N−1.

In addition to decrementing the segments left field 908, the SRv6 node 102 may update the destination address field 816 of the IPv6 header 714 of the packet 708 (block 1062). The Nth SID 108 in the SID list 106 identifies the next SRv6 102 to which the SRv6 packet 708 is to be routed. Accordingly, the current SRv6 node 102 sets the destination address field 816 to include the address of the next SRv6 node 102 identified by the Nth SID 108. The current SRv6 node 102 is identified by the (N+1)th SID 108 in the segment list 106.

Process 1050 may further include the SRv6 node 102 obtaining, from the (N+1)th SID, an S-NSSAI and a function identifier (block 1064). The SRv6 node 102 may obtain these values from fields 920 and 922 in the SID 108. Furthermore, the SRv6 node 102 may look up the function identifier in function table 714 to locate the corresponding instruction 712. The SRv6 node 102 may perform the function for the network slice corresponding to the S-NSSAI (block 1064).

The SRv6 node 102 may further process the SRv6 packet (block 1066). Processing the packet 708 may include, for example, sending the SRv6 packet 708 toward its destination. In another example, if the SRv6 node 102 is identified in the first SID 108 in the list 106, the SRv6 node 102 may decapsulate the SRv6 packet, and then further process the decapsulated packet in accordance with the header of the decapsulated packet. For example if the header of the decapsulated packet indicates a hop limit of zero, the SRv6 node 102 may drop the decapsulated packet. Returning to block 1058, if the numerical value in the segments left field 908 of the SRv6 header 716 of the packet 708 is not greater than zero (block 1058: no), the SRv6 node 102 may proceed to block 1066.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 10A and 10B, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network component comprising:
a memory to store instructions;
a processor to execute the instructions to:
obtain a Segment Routing Internet Version 6 (SRv6) packet, wherein when obtaining the SRv6 packet, the processor is to:
receive the SRv6 packet from another network component; or
create the SRv6 packet based on a different packet, wherein when creating the SRv6 packet, the processor is to:
create a new Internet Protocol Version 6 (IPv6) header;
create a new SRv6 header; and
encapsulate the different packet with the new IPv6 header and the new SRv6 header to generate the SRv6 packet;
determine a segment identifier, based on the SRv6 packet, that includes a node identifier, a function identifier, and a Single-Network Slice Selection Assistance Information (S-NSSAI);
obtain the function identifier and the S-NSSAI from the segment identifier; and
execute a first instruction, which corresponds to the function identifier, for a network slice specified by the S-NSSAI.

2. The network component of claim 1, wherein the network component includes one of:
a wireless station;
a cell site router (CSR); or
a User Plane Function (UPF) instance.

3. The network component of claim 1, wherein when the processor creates the new IPv6 header, the processor executes the instructions to:
set a source address field of the new IPv6 header to an address of the network component; and
set a destination address field of the new IPv6 header to an address specified by another segment identifier.

4. The network component of claim 1, wherein when the processor creates the new SRv6 header, the processor executes the instructions to:
set a segments left field of the new SRv6 to a numerical value that is one less than a number of segment identifiers in a segment list of the new SRv6 header, wherein the segment list includes the segment identifier.

5. The network component of claim 1, wherein when the processor receives the SRv6 packet, the processor executes the instructions to:
determine whether a value of a segments left field of an SRv6 header of the SRv6 packet is greater than zero;
if the determined value is greater than zero,
decrement the determined value in the segments left field; and
update a destination address field of an IPv6 header of the SRv6 packet; and
if the determined value is not greater than zero,
process an underlying packet encapsulated by the IPv6 header and the SRv6 header.

6. The network component of claim 5, wherein when the processor processes the underlying packet, the processor executes the instructions to:
forward the underlying packet to a destination specified by a header of the underlying packet.

7. The network component of claim 6, wherein the underlying packet includes an IPv6 packet.

8. The network component of claim 5, wherein when the processor updates the destination address field, the processor executes the instructions to:
set the destination address field to an address designated by another segment identifier, wherein the other segment identifier is included in a segment list of the SRv6 header, and wherein the other segment identifier is indexed by the decremented determined value of the segments left field.

9. The network component of claim 1, wherein when the processor executes the first instruction, the processor executes the instructions to:
retrieve, from a function table, the first instruction using the function identifier as a lookup key.

10. The network component of claim 9, wherein the processor further executes the instructions to:
receive the function table from another network component.

11. A method comprising:
obtaining by a network component a Segment Routing Internet Version 6 (SRv6) packet wherein obtaining the SRv6 packet further comprises:
receiving the SRv6 packet from another network component; or
creating the SRv6 packet based on a different packet, wherein creating the SRv6 packet includes:
creating a new Internet Protocol Version 6 (IPv6) header;
creating a new SRv6 header; and
encapsulating the different packet with the new IPv6 header and the new SRv6 header to generate the SRv6 packet;
determining a segment identifier, based on the SRv6 packet, that includes a node identifier, a function identifier, and a Single-Network Slice Selection Assistance Information (S-NSSAI);
obtaining the function identifier and the S-NSSAI from the segment identifier; and
executing a first instruction, which corresponds to the function identifier, for a network slice specified by the S-NSSAI.

12. The method of claim 11, wherein the network component includes one of:
a wireless station;
a cell site router (CSR); or
a User Plane Function (UPF) instance.

13. The method of claim 11, wherein creating the new IPv6 header includes:
setting a source address field of the new IPv6 header to an address of the network component; and
setting a destination address field of the new IPv6 header to an address specified by another segment identifier.

14. A non-transitory computer-readable medium comprising computer-executable instructions, when executed by one or more processors, cause the one or more processors to:
 obtain, by a network component, a Segment Routing Internet Version 6 (SRv6) packet wherein when obtaining the SRv6 packet, the one or more processors are to:
  receive the SRv6 packet from another network component; or
  create the SRv6 packet based on a different packet, wherein when creating the SRv6 packet, the one or more processors are further to:
   create a new Internet Protocol Version 6 (IPv6) header;
   create a new SRv6 header; and
   encapsulate the different packet with the new IPv6 header and the new SRv6 header to generate the SRv6 packet;
 determine a segment identifier, based on the SRv6 packet, that includes a node identifier, a function identifier, and a Single-Network Slice Selection Assistance Information (S-NSSAI);
 obtain the function identifier and the S-NSSAI from the segment identifier; and
 execute a first instruction, which corresponds to the function identifier, for a network slice specified by the S-NSSAI.

15. The non-transitory computer-readable medium of claim 14, wherein the network component includes one of:
 a wireless station;
 a cell site router (CSR); or
 a User Plane Function (UPF) instance.

16. The method of claim 11, wherein creating the new IPv6 header comprises:
 setting a source address field of the new IPv6 header to an address of the network component; and
 setting a destination address field of the new IPv6 header to an address specified by another segment identifier.

17. The method of claim 11, wherein creating the new SRv6 header includes:
 setting a segments left field of the new SRv6 to a numerical value that is one less than a number of segment identifiers in a segment list of the new SRv6 header, wherein the segment list includes the segment identifier.

18. The method of claim 11, wherein receiving the SRv6 packet includes:
 determining whether a value of a segments left field of an SRv6 header of the SRv6 packet is greater than zero;
 if the determined value is greater than zero,
  decrementing the determined value in the segments left field; and
  updating a destination address field of an IPv6 header of the SRv6 packet; and
 if the determined value is not greater than zero,
  processing an underlying packet encapsulated by the IPv6 header and the SRv6 header.

19. The method of claim 18, wherein processing the underlying packet includes:
 forwarding the underlying packet to a destination specified by a header of the underlying packet.

20. The method of claim 19, wherein the underlying packet includes an IPv6 packet.

* * * * *